Figure 11:
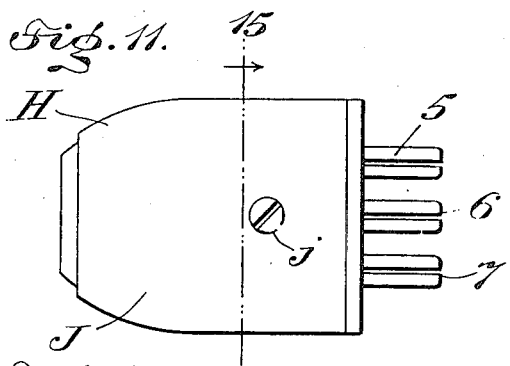

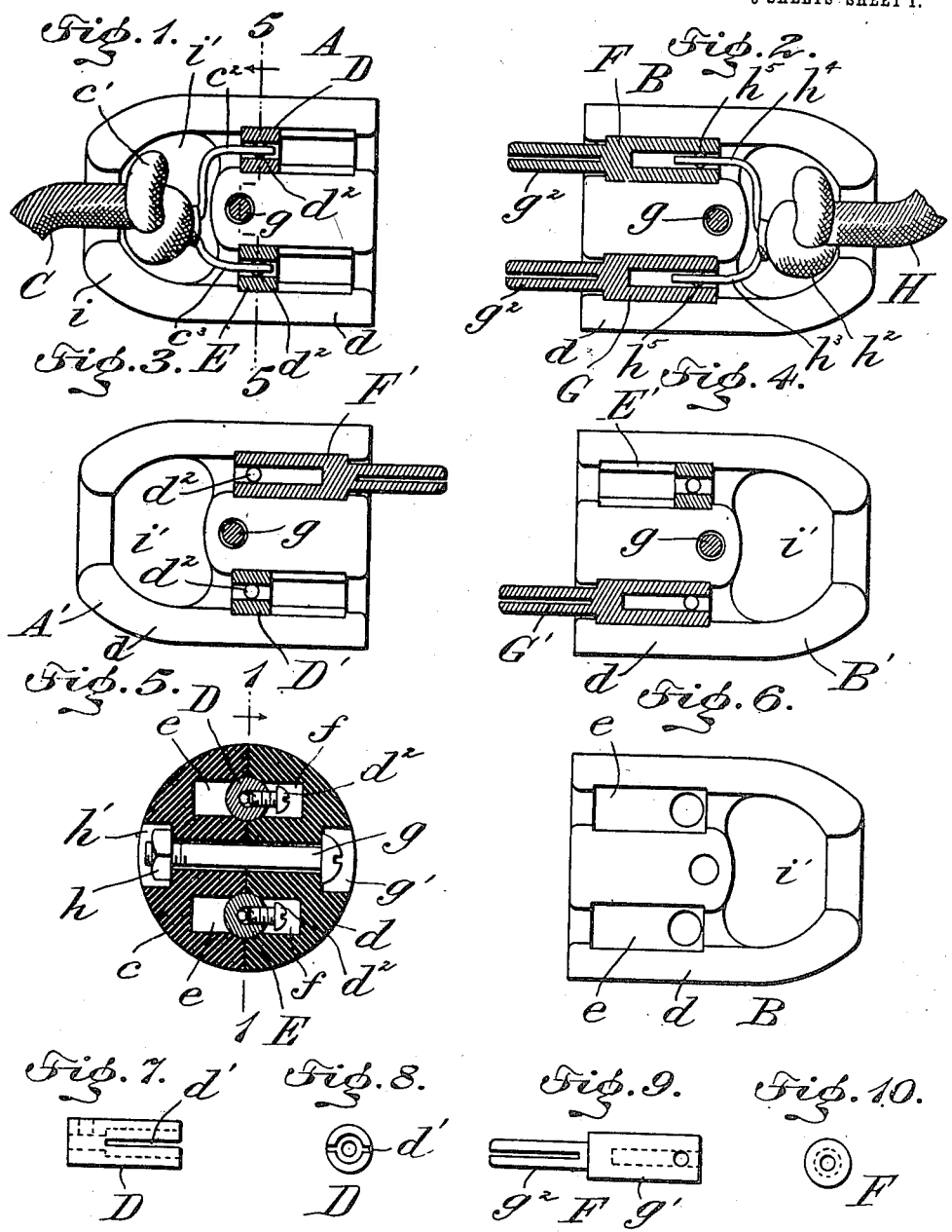

H. HERTZBERG & M. J. WOHL.
MULTIPLE WIRE PLUG.
APPLICATION FILED AUG. 23, 1907.

995,674.

Patented June 20, 1911.

3 SHEETS—SHEET 2.

WITNESSES
A. C. Abbott
V. E. Nichols

INVENTORS
Harry Hertzberg and
Maurice J. Wohl
BY Griffin & Burchard
ATTORNEYS

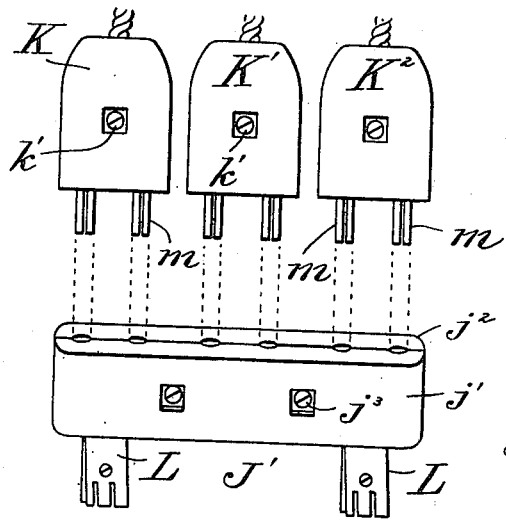
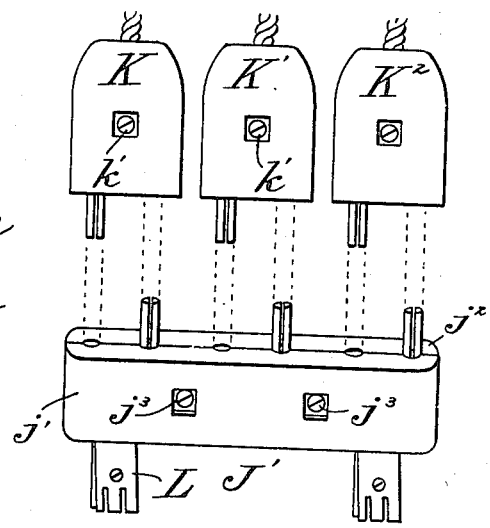
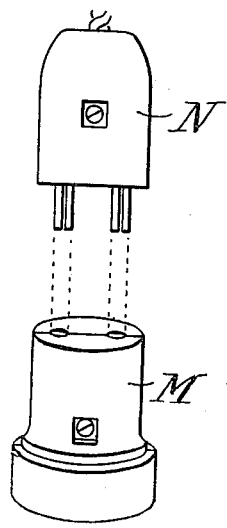
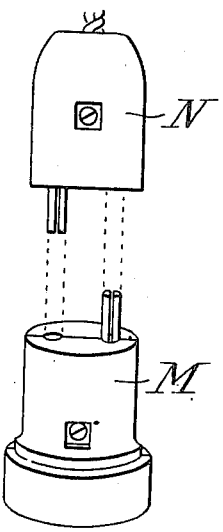

UNITED STATES PATENT OFFICE.

HARRY HERTZBERG AND MAURICE J. WOHL, OF NEW YORK, N. Y., ASSIGNORS TO ECONOMY ELECTRIC COMPANY, OF BROOKLYN, NEW YORK, A CORPORATION OF NEW YORK.

MULTIPLE-WIRE PLUG.

995,674.

Specification of Letters Patent. Patented June 20, 1911.

Application filed August 23, 1907. Serial No. 389,771.

*To all whom it may concern:*

Be it known that we, HARRY HERTZBERG and MAURICE J. WOHL, citizens of the United States, residing in the city of New York, borough of Brooklyn and borough of Manhattan, respectively, counties of Kings and New York, and State of New York, have invented a certain new and useful Multiple-Wire Plug, of which the following is a specification.

This invention is an electrical connection whereby a plurality of wires may be readily attached to the proper terminals in each of the members, and said members of the connection are adapted to be separated and assembled both easily and quickly without the possibility of producing a short circuit or of pulling out the aforesaid wires.

We seek to produce a connection which can be manufactured economically and wired expeditiously.

According to the invention, it contemplates a pair of coöperating members, each composed of insulating complemental sections and metallic terminals clamped in said sections. The sections of each member are held together and clamped upon the metallic terminals by screws, or equivalent means, and each terminal consists of or is provided with a split metallic sleeve in which the wire is secured firmly by a suitable clamp.

The terminals of the members are constructed male and female, respectively, in order that the members may be assembled or separated by a simple operation. In some cases, the female terminals may be provided on one member, and the male terminals on the other member, in order that the members may be readily interchanged, for reversing the polarity; but each member may have a male terminal and a female terminal when the connection is used on a circuit of fixed or non-changeable polarity.

One important feature of the connection is the provision for anchoring a multiple wire " cord " in each member thereof so that the wires cannot be pulled out of the member accidentally. We prefer to make a cavity or chamber in the rear end portion of each member, back of the terminals therein, and in this chamber is adapted to be received a knot or other projection of the aforesaid cord, whereby a pull or strain on the cord is brought by the knot into engagement mechanically with the solid part of the member so as to relieve the electrical connection between the wires and the terminals from undue strain.

In the accompanying drawings, we have illustrated one practical embodiment of the invention, but the construction shown therein is to be understood as illustrative only, and not as defining the limits of the invention.

Figure 15:
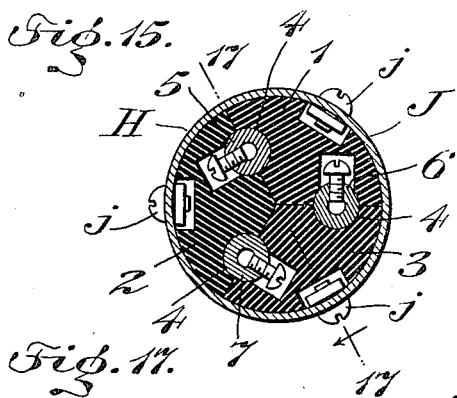
Figure 16:
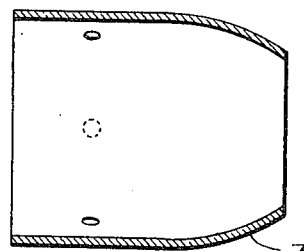
Figure 17:
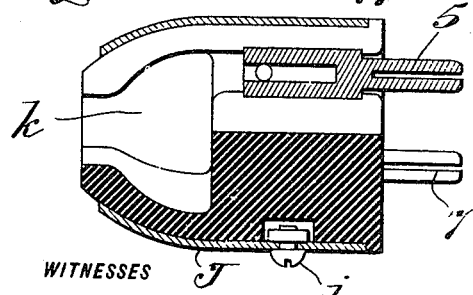
Figure 18:
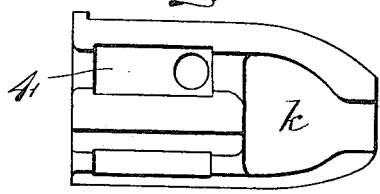

Figure 1 is a side elevation, partly in section, showing a female member of the connection. Fig. 2 is a similar view illustrating the male member of the connection adapted to coöperate with the female member of Fig. 1 when it is desired to reverse the polarity of the terminals. Figs. 3 and 4 are side views, partly in section, of coöperating members having terminals which are adapted for use on circuits of non-interchangeable polarity. Fig. 5 is a cross section on the line 5—5 of Fig. 1. Fig. 6 is a detail view of one of the insulating pieces adapted to form a section of a member. Figs. 7 and 8 are enlarged detail views of a split metallic tube forming a female terminal. Figs. 9 and 10 are side and end views of a split metallic male terminal. Figs. 11, 12, 13, and 14 are side views showing our invention embodied in a three wire connection. Fig. 15 is a cross section on the line 15—15 of Fig. 11. Fig. 16 is a detail view of a metallic shell. Fig. 17 is a longitudinal section on the line 17—17 of Fig. 15. Fig. 18 is a detail view of one piece of porcelain used in the construction of the device shown in Figs. 11 to 17 inclusive. Figs. 19, 20, and 21 are perspective views of other embodiments of the invention wherein provision is made for tapping off the current at a number of points. Figs. 22, and 23 are perspective views of other forms of current taps constructed in accordance with the invention.

A, B, designate the coöperating members employed in our connection. In the construction of Figs. 1 to 6 inclusive, each member, A, B, is composed of two sections, *c, d,* each section consisting of insulating material, such as porcelain, molded in one piece to the required shape. The sections, *c, d,* are semi-circular in cross section so as to provide flat inner faces adapted to be assembled into matching relation. Said sections, *c, d,* are provided on their flat inner faces with corresponding recesses, *e, f,* which are adapted to register and thereby produce sockets in which are clamped the terminals presently described. In the two-part member shown in Figs. 1 to 6 inclusive, the matching sections, $c$, $d$, are adapted to be secured into clamping engagement with the terminals by a bolt or screw, $g$, the head of said bolt being countersunk in a recess, $g'$, of the section, $d$. The threaded end of the bolt engages with a nut, $h$, which is countersunk in a recess, $h'$, of the section, $c$.

One end of each member is flat, whereas the other end is curved as at $i$, and in this curved portion of the member is a cavity or chamber, $i'$, which is adapted to receive a knot, $c'$, of a contacting cord or cable, C.

The member, A, is provided with metallic terminals D, E, which are fitted in the recesses, $e$, $f$, and are clamped by the sections, $c$, $d$, when they are drawn together by the bolt, $g$, and the nut, $h$. The socket terminals, D, E, each consists of a metallic tube which is split for a part of its length as at $d'$ in Figs. 7 and 8, and the solid inner part of this socket terminal is provided with a threaded or tapped opening in which is threaded a clamping screw, $d^2$, whereby the wires, $c^2$, $c^3$, of the cord, C, are adapted to be fastened securely in the socket terminals, D, E.

The plug terminals, F, G, are clamped in the member, B, of the connection by the operation of drawing the sections, $c$, $d$, together by the screw, $g$. Each terminal connection consists of a sleeve, $g'$, and a slotted tenon, $g^2$, the sleeve portion of the terminal having a threaded opening adapted to receive a screw similar to the screw, $d^2$. The terminals, F, G, have their sleeve portions clamped by and between the sections composing the member, B, whereas tenons, $g^2$ of said terminals extend or project from the flat end of said member, B. A two-wire cord, H, is provided with a knot, $h^2$, and wires, $h^3$, $h^4$, of said cord are fitted in the sleeve portions, $g'$, of said terminals, F, G, whereby said wires are adapted to be clamped in place by screws, $h^5$.

It will be readily understood that the members, A, B, are adapted to be assembled into abutting relation, and the tenons, $g$, of the member, B, are adapted to fit into the split portions, $d'$, of the socket terminals in the member, A, whereby the connection between the contacting cords, C, H, are completed through the terminals, D, E, of the member, A, and the terminals, F, G, of the member, B.

The member, A, is shown as having two socket terminals and the member, B, as equipped with two plug terminals. The plugs, F, G, are adapted to fit in the sockets, D, E, respectively, but the position of one member with respect to the other member may be reversed in order to change the relation of the plug terminals, F, G, and the socket terminals, D, E, should the polarity of the circuit be changed.

The construction shown in Figs. 3 and 4 consists of the members, A', B', each composed of two sections of insulating material held together by a clamping screw, $g$. The member, A', has a socket terminal, D', and a plug terminal, F', whereas the companion member, B', has a socket terminal, E', and a plug terminal, G', said terminals being constructed as heretofore described and clamped in place by and between the sections of the respective members. Said connection of Figs. 3 and 4 is adapted to be used on a circuit, the polarity of which is not subject to change. When the members are assembled, the plug terminals fit in the socket terminals as heretofore described to complete the circuit. Each member has the curved chamber, $i'$, or $h^2$, to receive the knot or projection on the conducting cord or cable.

Figure 12:
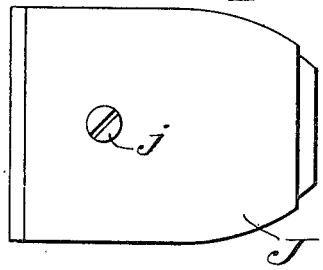

The connection shown in Figs. 11 to 18 inclusive, is adapted for connecting groups of wires, each composed of three wires, said connection of the aforesaid figures embodying the salient features of the device as heretofore described. The member, H, is composed of a plurality of sections 1, 2, 3, divided on three lines radiating from a common center, each section being molded to the required form and composed of a single piece of insulating material, such as porcelain. Said members in cross section are each provided with a curved outer face and two flat inner faces which meet at an angle, whereby the sections are adapted to be assembled in abutting relation and to produce a substantially cylindrical device. Said sections are provided on the meeting faces thereof with recesses 4, and when assembled these recesses register so as to clamp the terminals 5, 6, 7 by and between said members. The terminals of the member H, are similar to the plug terminals heretofore described in connection with Figs. 1 to 10 inclusive. The other member, I, of the three wire connection shown in Fig. 12 is composed of three sections similar to the sections 1, 2, and 3 of Figs. 11 and 15, and said member, I, is provided with socket terminals similar to the ports, D, D', and E, E', of Figs. 1, 3, 4, 7, and 8, said socket terminals being received in the recesses of the sections and adapted to be clamped by and between the same. Each member, H, and I, has its sections bound together by a clamping device herein shown as an external metallic shell, J, which conforms to the shape of the member so as to closely embrace the sections, and this shell is held in place by a screw, $j$, or by a plurality of such screws which enter the sections of the member. Furthermore, each member has a curved socket, k, in which is received the knotted end, or the projection, of a three wire cord, and the wires of such cord are fastened individually to the terminals within the member, in the manner heretofore described.

Figure 13:
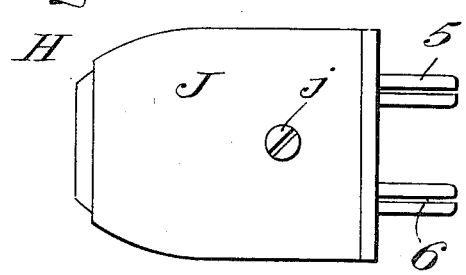
Figure 14:
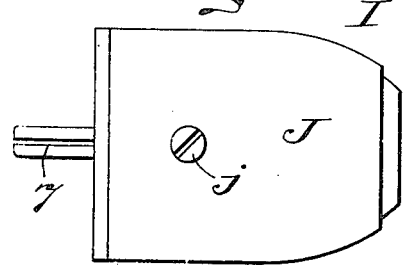

The plug terminals of one member may all be attached thereto, and the socket terminals may all be attached to or housed within the other member, see Figs. 11 and 12, or if desired, two of the plug terminals and one socket terminal may be fastened to one member, H, while one plug terminal and two socket terminals may be provided on the other member, I, as in Figs. 13 and 14, but the method of arranging the terminals may be modified as desired.

In Figs. 19, 20 and 21 we have shown multiple tap attachments by which a circuit may be tapped at a number of places, and in each form of attachment the parts are constructed in accordance with the invention. As shown in said figures, the attachment comprises a base member, J', and a plurality of tap members, K, K', K², the latter being individually fitted to, and removable from, said base member, J'. The base member, J', is split or divided lengthwise so as to produce longitudinal matching sections, j', j², which are held or clamped together by suitable means, such as the screws j³. Each tap member consists of a plurality of sections clamped together by a screw or screws, k', as hereinbefore described in connection with the preceding figures of the drawings. Furthermore, the base member, J', is equipped with means, such as the tongues, L, by which said member may be connected in an appropriate electric circuit.

The base and taps of the attachment shown in Fig. 19 are provided with terminals such as heretofore described whereby the polarity of the current tapped from the main line may be changed. In said Fig. 19, the base member, J', has a number of socket terminals clamped within and concealed by the sections, j', j², thereof, whereas each tap member, K, K', K², is provided with a corresponding number of male terminals, m, the latter projecting from said tap members. Each tap member may be seated on the base member so that the male terminals, m, will be received in the socket terminals within said base member, thus making electrical connection. Should it be desired to tap off a current the same in polarity as that of the circuit, the taps are inserted as shown in Fig. 19, but to reverse the polarity in the tapped line, each plug should be reversed or turned half way around, in order to change the relation of the male terminals, m, to the socket terminals.

Fig. 20, represents an attachment with a plurality of non-pole changing taps adapted for use on battery or arc light circuits. The base member, J', has a plurality of concealed socket terminals and a plurality of exposed male terminals, whereas each tap member is equipped with a single exposed male terminal and a single concealed socket terminal, whereby each member when seated on or fitted to the base, is adapted to receive in its socket terminal the male terminal of the base while at the same time the male terminal of the tap fits into one of the socket terminals of the base. Hence, the terminals of the base and tap have such relation that the tap cannot be fitted to the base without first assuming a predetermined relation which overcomes any tendency of reversing the tap and changing the polarity.

The attachment of Fig. 21 employs a plurality of pole-changing or reversible taps similar to the attachment of Fig. 19, but in said construction of Fig. 21, the base member, J', is equipped with sets of exposed male terminals, m, while each tap is provided with concealed socket terminals adapted to receive the proper male terminals when the tap is fitted to the base.

The attachments shown in Figs. 22 and 23 are, respectively, a single pole changing receptacle tap and a single non-pole changing receptacle tap. In each construction, the receptacle or base, M, consists of sections held together and adapted to clamp suitable terminals between said sections, while the tap, N, consists of sections held together and clamping other terminals between said sections. In Fig. 22, the base, M, has socket terminals and the tap has male terminals, whereas in Fig. 23 each part, M, N, has a socket terminal and a plug terminal. Of course, the attachments should be composed of porcelain, or other insulating material.

Having thus fully described the invention, what we claim as new, and desire to secure by Letters Patent is:

1. In a multiple-wire connection, a plurality of members, each member being composed of insulating material which is divided lengthwise on at least three lines of division and produces matching sections, coöperating plug-terminals and socket-terminals in the respective members and adapted to separably and mechanically couple said members, and clamping means operating to clamp the sections of each member upon the terminals therein, said clamping means being separate from the plug-terminals and socket-terminals which are held in the respective members.

2. In a multiple-wire connection, a member composed of insulating material and divided lengthwise on at least three lines so as to produce a series of complemental and interchangeable sections which are held together by an external sleeve, means for retaining said sleeve from rotary displacement on said sections, and terminals each clamped between two adjacent sections of the divided member by frictional engagement with said sections.

3. In a multiple-wire connection, a member composed of insulating material and divided lengthwise on at least three lines of division extending radially from a common axis, thereby producing a series of complemental sections which are provided in their opposing contacting surfaces with registering recesses, metallic terminals occupying said recesses of the sections, and means for compressing the sections into frictional engagement with said metallic terminals.

In testimony whereof we have signed our names to this specification in the presence of two subscribing witnesses.

HARRY HERTZBERG.
MAURICE J. WOHL.

Witnesses:
JAS. H. GRIFFIN,
H. I. BERNHARD.